(12) United States Patent
Ohtake et al.

(10) Patent No.: US 11,541,942 B2
(45) Date of Patent: Jan. 3, 2023

(54) VEHICLE BOTTOM STRUCTURE

(71) Applicant: Toyota Jidosha Kabushiki Kaisha, Toyota (JP)

(72) Inventors: Kazuki Ohtake, Toyota (JP); Hideo Takeda, Hekinan (JP); Yasuhide Matsuo, Toyota (JP); Ayaka Kagami, Inazawa (JP); Soshiro Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 17/336,868

(22) Filed: Jun. 2, 2021

(65) Prior Publication Data

US 2022/0073150 A1 Mar. 10, 2022

(30) Foreign Application Priority Data

Sep. 10, 2020 (JP) .............................. JP2020-152082

(51) Int. Cl.
*B60J 7/00* (2006.01)
*B62D 25/20* (2006.01)

(52) U.S. Cl.
CPC .................................. *B62D 25/20* (2013.01)

(58) Field of Classification Search
CPC .............. B60K 1/04; B60K 2001/0438; B62D 25/2036; B62D 25/025; B62D 21/157; Y10S 414/134; G05D 2201/0216; G05D 1/0272; G05D 1/0265; B60N 2/305
See application file for complete search history.

(56) References Cited

U.S. PATENT DOCUMENTS

| | | | | |
|---|---|---|---|---|
| 4,804,308 A | * | 2/1989 | Hamblin | ................... B66B 9/00 D34/28 |
| 5,380,144 A | * | 1/1995 | Smith | ..................... A61G 3/061 14/71.3 |
| 5,632,593 A | * | 5/1997 | Aoki | ..................... B60P 1/4478 414/545 |
| 5,676,515 A | * | 10/1997 | Haustein | ................. B60P 1/431 414/921 |
| 2019/0193620 A1 | * | 6/2019 | Matsuoka | ............ B60K 7/0007 |
| 2022/0194489 A1 | * | 6/2022 | Roche | ................. B60R 16/0207 |

FOREIGN PATENT DOCUMENTS

| | | |
|---|---|---|
| JP | 2005-046211 A | 2/2005 |
| JP | 2019-116112 A | 7/2019 |

* cited by examiner

*Primary Examiner* — Kiran B Patel
(74) *Attorney, Agent, or Firm* — Dinsmore & Shohl LLP

(57) ABSTRACT

A vehicle bottom structure includes a slope device including a slope plate and guide rails, floor crossmembers, and a floor panel structure. The floor crossmembers are arranged at intervals in the vehicle front-rear direction. The slope device is provided between paired floor crossmembers, and the slope device is provided below a standing-ride region. The floor panel structure is provided over the paired floor crossmembers such that the floor panel structure is placed above the slope device and serves as a floor material in the standing-ride region. The floor panel structure includes panel segments extended in the vehicle front-rear direction so as to be provided over the paired floor crossmembers, and the panel segments are shorter than the whole length of the standing-ride region in the vehicle width direction. The panel segments are arranged side by side in the vehicle width direction in the standing-ride region.

4 Claims, 10 Drawing Sheets

VEHICLE BOTTOM STRUCTURE

CROSS-REFERENCE TO RELATED APPLICATION

This application claims priority to Japanese Patent Application No. 2020-152082 filed on Sep. 10, 2020, incorporated herein by reference in its entirety.

BACKGROUND

1. Technical Field

The present specification describes a vehicle bottom structure, particularly, a vehicle bottom structure in which a slope device for boarding and alighting is stored.

2. Description of Related Art

A floor of a vehicle cabin is provided in a bottom portion of a vehicle, and various devices are provided further under the floor. For example, like Japanese Unexamined Patent Application Publication No. 2005-46211 (JP 2005-46211 A), a slope device for boarding and alighting is provided under the floor of the vehicle cabin.

For example, the slope device is a draw-out type and includes a slope plate and guide rails configured to guide the movement of the slope plate at the time when the slope plate is drawn out and at the time when the slope plate is stored. The slope plate is stored under the floor of the vehicle cabin while the vehicle travels, and when the vehicle stops, the slope plate is drawn outwardly in the vehicle width direction from under the floor of the vehicle cabin.

The slope device is provided so as to correspond to a doorway of the vehicle. For example, a slope opening from which the slope plate is drawn out is formed below the doorway of the vehicle.

In a case where the vehicle is a shared-type vehicle such as a bus, the floor of the vehicle cabin is provided with a seat region where seats are provided and a standing-ride region where a passenger rides in a standing state. The standing-ride region is often provided near the doorway. Therefore, the standing-ride region may be set above the slope device.

SUMMARY

In the meantime, a relatively large load is applied to the standing-ride region where the passenger density is higher than the seat region. When the standing-ride region on a floor panel deforms to sink due to a load input, a sinking part might interfere with the movement of the slope plate provided below the standing-ride region.

In view of this, the present specification describes a vehicle bottom structure that can improve maintenance performance in a standing-ride region on a floor panel more than that in the related art.

A vehicle bottom structure described in the present specification is a vehicle bottom structure having a standing-ride region provided as a region inside a vehicle cabin with a doorway being provided at a side face of the standing-ride region. The vehicle bottom structure includes a plurality of floor crossmembers, a slope device, and a floor panel structure. The floor crossmembers are frame members provided in a vehicle bottom portion in an extended manner in the vehicle width direction, and the floor crossmembers are arranged at intervals in the vehicle front-rear direction. The slope device is provided between paired floor crossmembers among the floor crossmembers, and the slope device is provided below the standing-ride region. The floor panel structure serves as a floor material in the standing-ride region, and the floor panel structure is provided over the paired floor crossmembers such that the floor panel structure is placed above the slope device. The floor panel structure includes a plurality of panel segments extended in the vehicle front-rear direction so as to be provided over the paired floor crossmembers, and a whole length of the plurality of the panel segments in the vehicle width direction are shorter than the whole length of the standing-ride region in the vehicle width direction. The panel segments are arranged side by side in the vehicle width direction in the standing-ride region.

In the above configuration, instead of covering a whole floor of the vehicle cabin with a single floor panel, the standing-ride region on a floor panel is covered with the floor panel structure. Hereby, when sinking deformation occurs in the standing-ride region, only the floor panel structure is just replaced from the floor of the vehicle cabin, and thus, maintenance performance in the standing-ride region on the floor panel improves. Further, in a case where the panel segments constituting the floor panel structure are placed on a vehicle cabin floor independently from each other, when sinking deformation occurs in the standing-ride region, only a deformed panel segment is just replaced. Thus, the maintenance performance in the standing-ride region on the floor panel improves.

Further, in the above configuration, the slope device may include a slope plate and a pair of guide rails. The slope plate may be drawable outwardly in the vehicle width direction. The guide rails may be configured to guide the slope plate, the guide rails being extended in the vehicle width direction and provided at an interval in the vehicle front-rear direction. The guide rails may be arranged side by side with the paired floor crossmembers and fixed to the paired floor crossmembers. The panel segments may be supported by the guide rails in addition to the paired floor crossmembers.

In the above configuration, since the panel segments are supported by the guide rails in addition to the paired floor crossmembers, it is possible to further restrain sinking deformation of the panel segments.

Further, in the above configuration, the panel segments may each have a rectangular tubular shape in which a section perpendicular to an axis in the vehicle front-rear direction has a rectangular shape. An upper wall of a panel segment placed on an outer side in the vehicle width direction among the panel segments may be inclined downward toward the outer side in the vehicle width direction. The panel segment placed on the outer side in the vehicle width direction may be formed such that a height of the upper wall is lower than a height of an upper wall of a panel segment placed on an inner side in the vehicle width direction among the panel segments. The wall thickness of the panel segment placed on the outer side in the vehicle width direction may be thicker than the wall thickness of the panel segment placed on the inner side in the vehicle width direction.

With the above configuration, a decrease in rigidity along with a decrease in height in the panel segments is compensated by the increase in wall thickness.

Further, a vehicle bottom structure described in the present specification is a vehicle bottom structure having an aisle region provided as a region in a vehicle cabin and serving as an aisle from a doorway to a passenger seat. The vehicle bottom structure includes a plurality of floor crossmembers, a slope device, and a floor panel structure. The floor crossmembers are frame members provided in a vehicle bottom portion in an extended manner in the vehicle width direction, and the floor crossmembers are arranged at intervals in the vehicle front-rear direction. The slope device is provided between paired floor crossmembers among the floor crossmembers, and the slope device is provided below the aisle region. The floor panel structure serves as a floor material in the aisle region, and the floor panel structure is provided over the paired floor crossmembers such that the floor panel structure is placed above the slope device. The floor panel structure includes a plurality of panel segments extended in the vehicle front-rear direction so as to be provided over the paired floor crossmembers, and a whole length of the plurality of the panel segments in the vehicle width direction are shorter than the whole length of the aisle region in the vehicle width direction. The panel segments are arranged side by side in the vehicle width direction in the aisle region.

With the vehicle bottom structure described in the present specification, the maintenance performance in the standing-ride region of the floor panel can be improved as compared with the related art.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
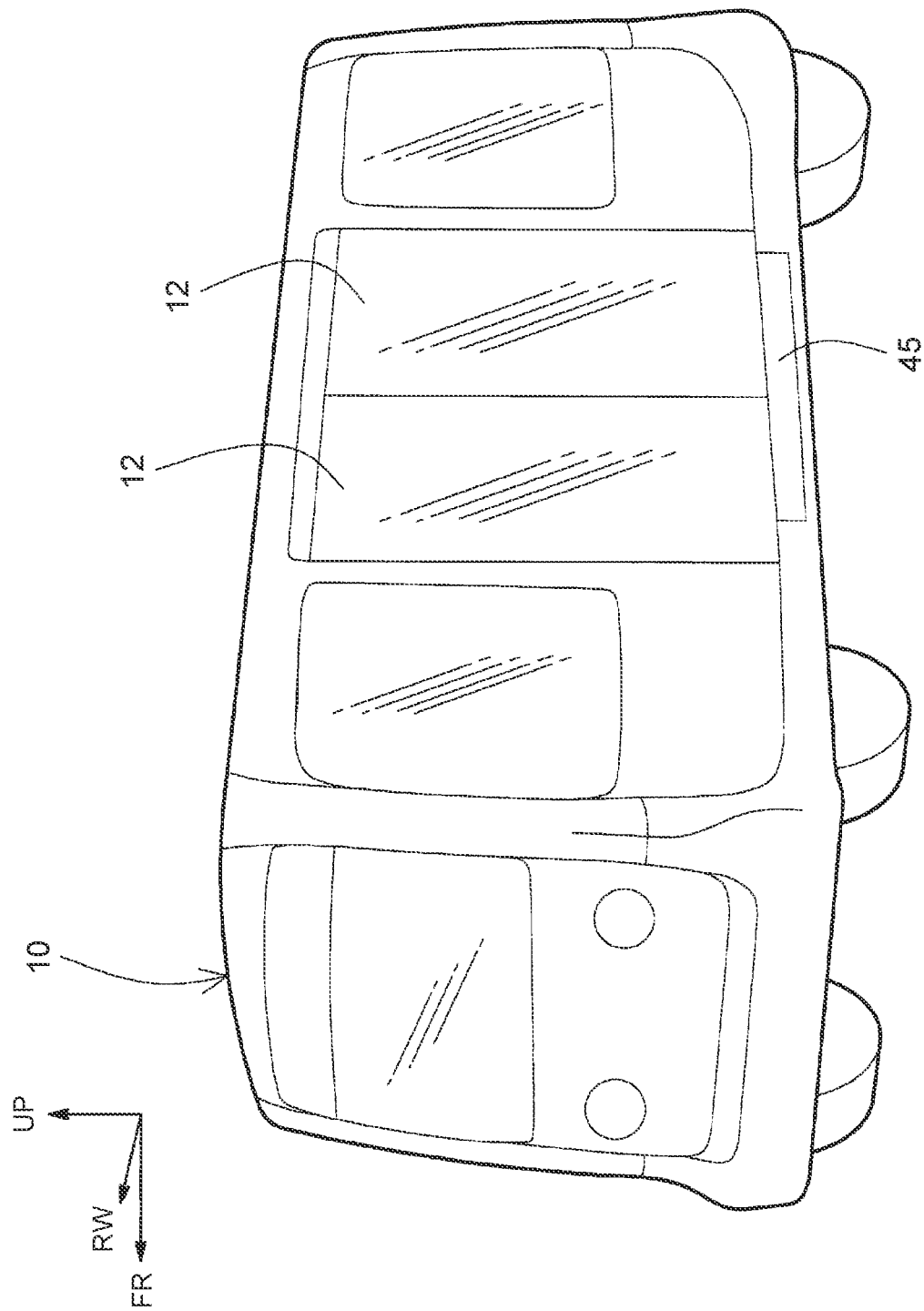
FIG. 1 is a perspective view illustrating a vehicle having a vehicle bottom structure according to the present embodiment.

FIG. 1 illustrates a vehicle 10 having a vehicle bottom structure according to the present embodiment. Note that, in FIGS. 1 to 10, a vehicle front-rear direction is illustrated along an axis indicated by a reference sign FR, a vehicle width direction is illustrated along an axis indicated by a reference sign RW, and a vertical direction is illustrated along an axis indicated by a reference sign UP. Along a front-rear-direction axis FR, the front side in the vehicle front-rear direction is a positive direction. Along a width-direction axis RW, the right side is a positive direction. Further, along a height axis UP, the upper side is a positive direction. These three axes are perpendicular to each other.

The vehicle 10 illustrated in FIG. 1 has a size of around a mini-bus, for example, and is used as a shared vehicle. For example, the vehicle 10 travels on a determined round route and stops at stops provided along the round route. At the time when the vehicle 10 stops, a slope plate 40 illustrated in FIG. 2 is drawn outwardly in the vehicle width direction for boarding and alighting of a passenger who uses a wheelchair.

The vehicle 10 may be an electric vehicle using a rotary electric machine (not shown) as a drive source. Further, the vehicle 10 is switchable between manual driving and automated driving.

A side face of the vehicle 10, that is, a surface perpendicular to the RW-axis is provided with double slide-type doors 12. The doors 12 are hanging-type doors, for example, and a rail mechanism (not shown) is provided above the doors 12. When the doors 12 are hanging-type doors, it is possible to avoid interference with a slope device provided below the doors 12.

Figure 2:
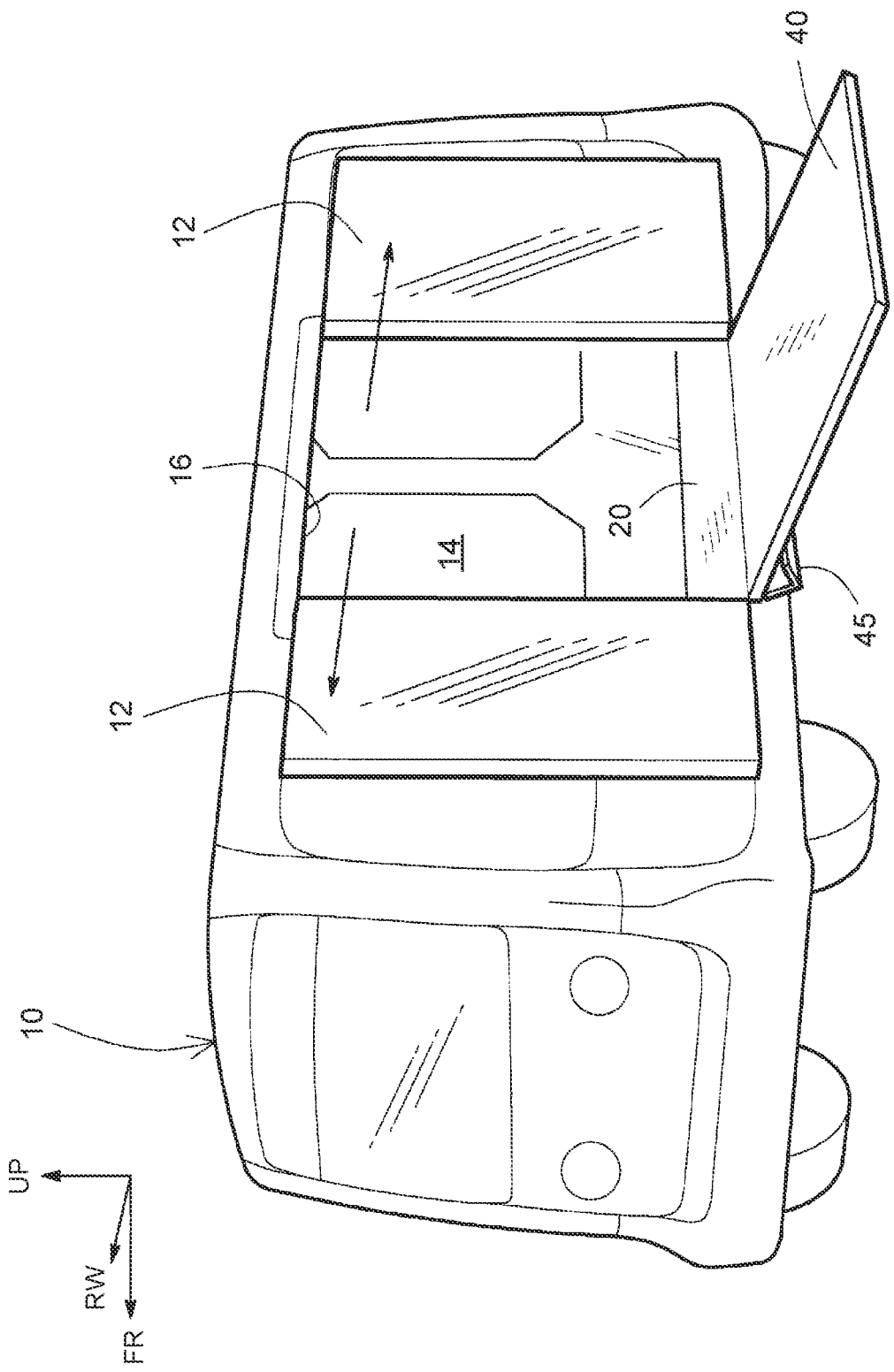
FIG. 2 is a perspective view illustrating a state where a door of the vehicle is opened, and a slope plate is drawn out of the vehicle.

As illustrated in FIG. 2, when the doors 12 move to their open positions to open a doorway 16, a vehicle cabin 14 including a floor face 20 of a low floor type appears. The vehicle cabin 14 is designed so that the height of the floor face 20 from a road surface is not less than 200 mm but not more than 300 mm, for example.

As illustrated in FIG. 2, the slope device is provided under the floor of the vehicle cabin 14. The slope device includes the slope plate 40 and guide rails 42 (see FIG. 5). The slope device is provided below the doorway 16. At the time when the doors 12 are opened, a slope cover 45 is opened, so that the slope plate 40 stored under the floor of the vehicle cabin 14 is drawn outwardly in the vehicle width direction.

For example, when the vehicle 10 arrives at a stop, the slope plate 40 is first drawn outwardly in the vehicle width direction. When the drawing-out of the slope plate 40 is finished, the doors 12 are opened, so that a passenger can get on and off the vehicle 10. When the getting on and off of the passenger is finished, the doors 12 are closed. After that, the slope plate 40 is stored inwardly in the vehicle width direction, and the slope cover 45 is closed. As will be described later, the slope device is provided below a standing-ride region 22 (see FIG. 3) of the vehicle cabin 14.

Figure 3:
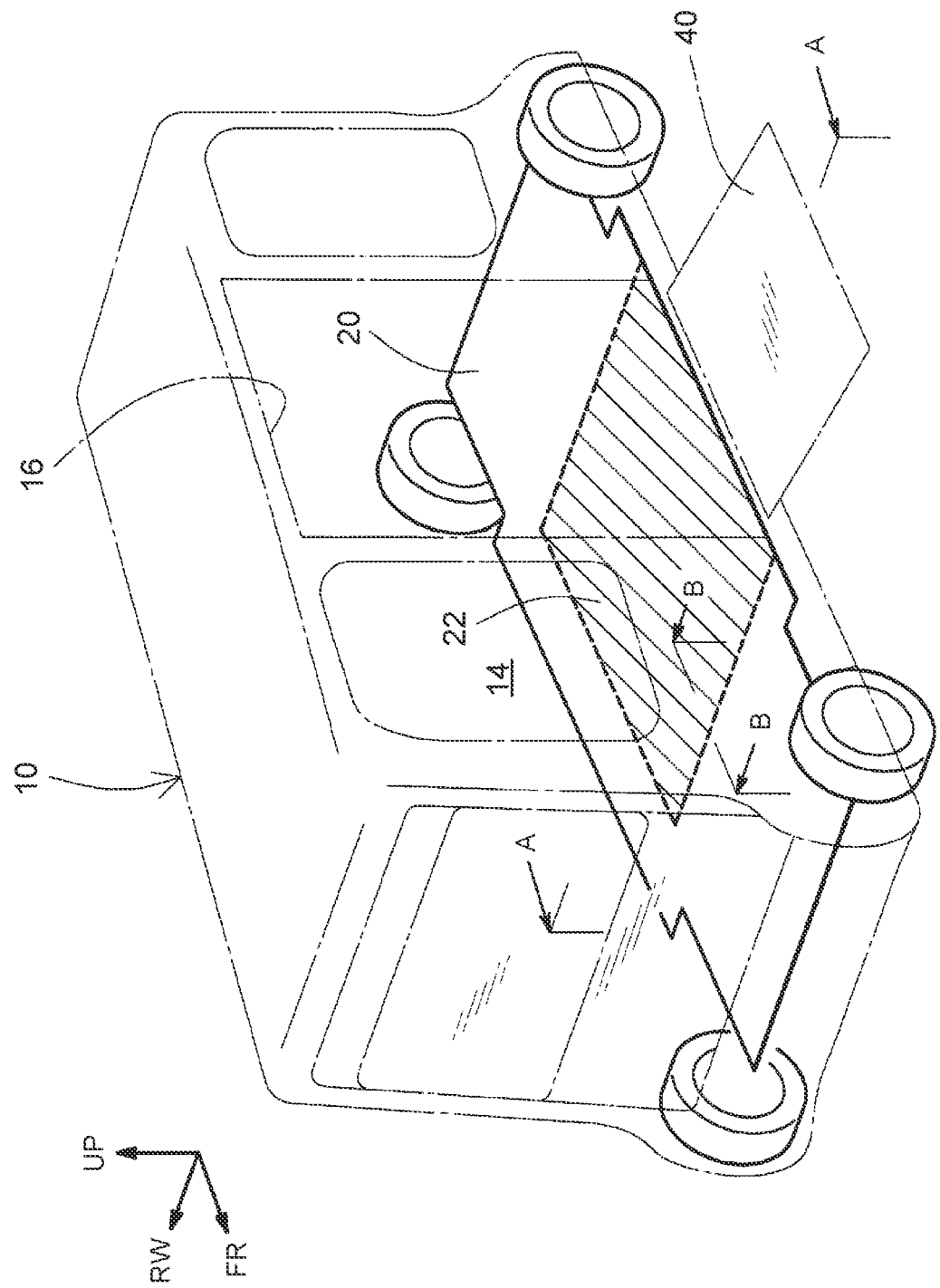
FIG. 3 is a view illustrating a standing-ride region in a vehicle cabin.

FIG. 3 illustrates the layout in the vehicle cabin. The vehicle cabin 14 is classified roughly into a driver seat area (not shown) and a passenger area (not shown). The passenger area is further classified to a seat region where seats (not shown) are provided and the standing-ride region 22 where a passenger rides in a standing state. The standing-ride region 22 is provided beside the doorway 16. More specifically, the standing-ride region 22 is determined as a region inside the vehicle cabin with the doorway 16 being provided as a side face for the standing-ride region 22. For example, in the standing-ride region 22, hand straps and poles for supporting passengers riding in a standing state are provided in a ceiling part or a side wall part of the vehicle cabin 14. At least the standing-ride region 22 on the floor face 20 of the vehicle cabin 14 has a low-floor structure as described above.

Further, in a case where the standing-ride region 22 is regarded as a floor region of the vehicle cabin 14, when the vehicle 10 is empty, the standing-ride region 22 is used as a moving aisle from the doorway 16 to seats (passenger seats). From this point, the standing-ride region 22 can be regarded as an aisle region from the doorway 16 to the seats.

Figure 4:
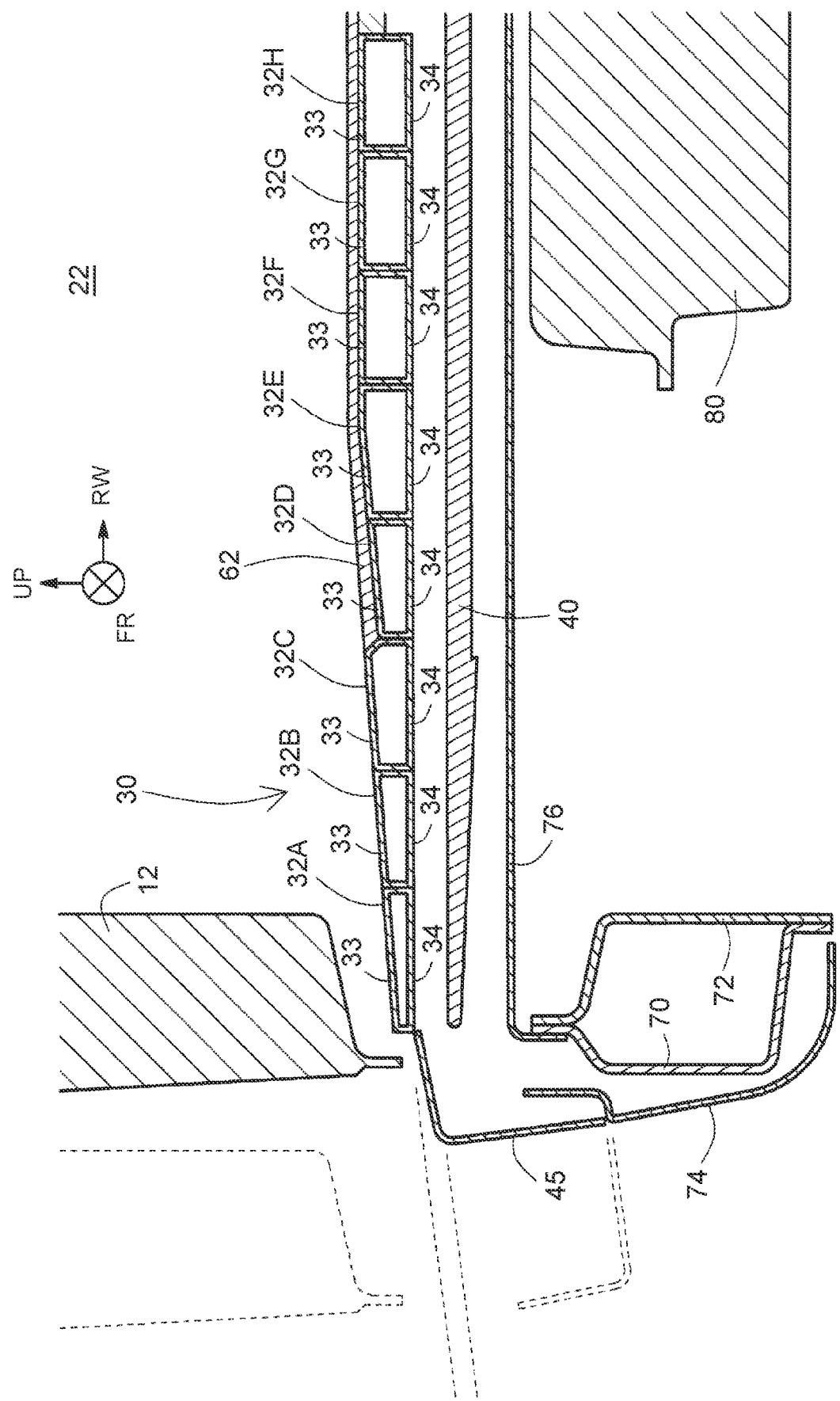
FIG. 4 is a sectional view taken along an end surface A-A in FIG. 3.
Figure 5:
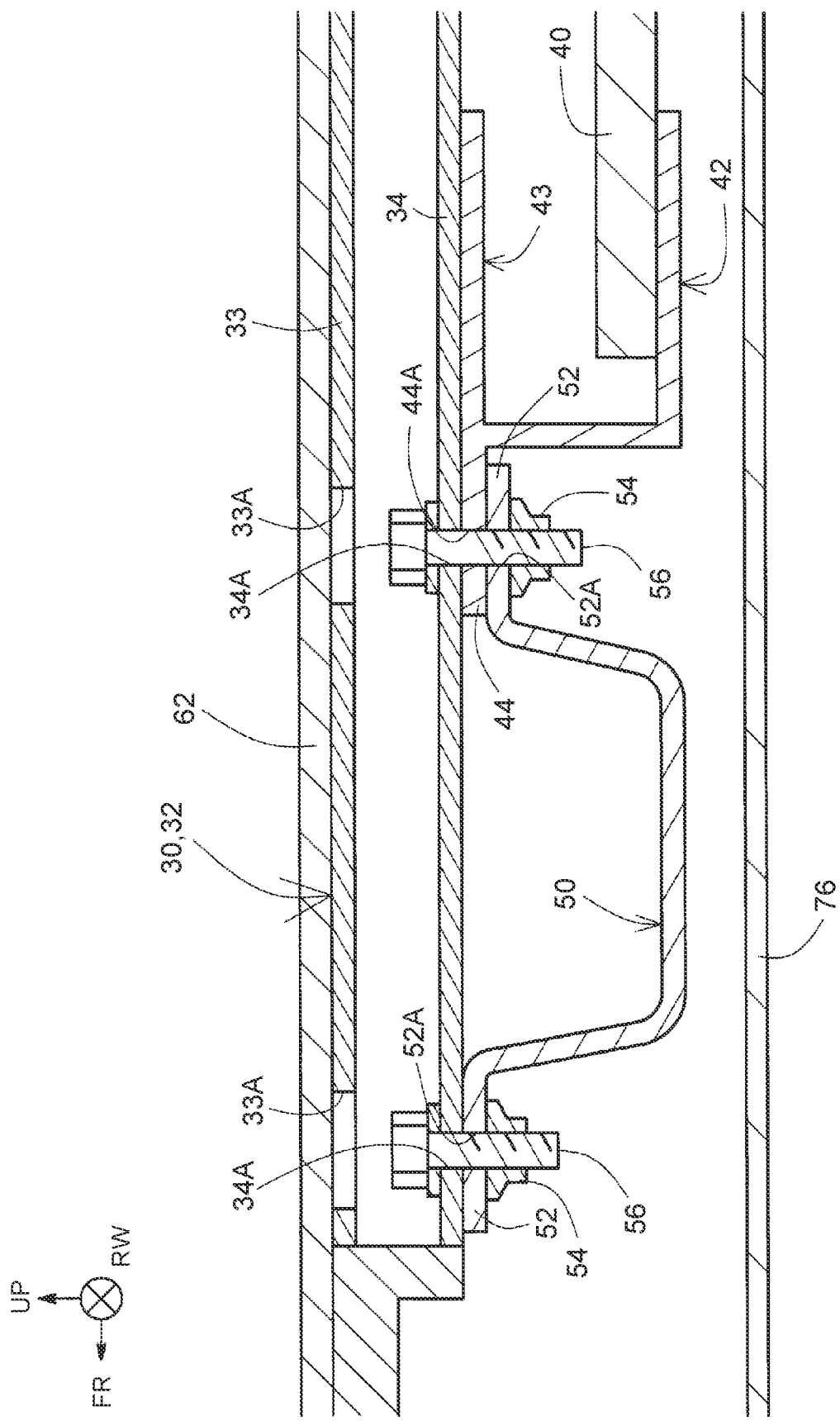
FIG. 5 is a sectional view taken along an end surface B-B in FIG. 3.

FIG. 4 is a sectional view (UP-RW sectional view) taken along an end surface A-A in FIG. 3 as the vehicle bottom structure. FIG. 5 is a sectional view (UP-FR sectional view) taken along an end surface B-B in FIG. 3.

As a frame structure of a vehicle bottom portion, the vehicle 10 includes a rocker (a rocker outer 70 and a rocker inner 72) illustrated in FIG. 4 and a floor crossmember 50 illustrated in FIG. 5.

The rocker is a frame member provided in each end of the vehicle bottom portion in the vehicle width direction so as to be extended in the vehicle front-rear direction. The rocker has a closed-section structure in which the rocker outer 70 as an outer member is joined to the rocker inner 72 as an inner member. A rocker molding 74 as a protective member is provided to cover the outer side of the rocker in the vehicle width direction.

The floor crossmember 50 is a frame member extended in the vehicle width direction. The opposite ends of the floor crossmember 50 in the vehicle width direction are fixed to the rockers, for example. A plurality of floor crossmembers 50 is provided such that the floor crossmembers 50 are arranged at intervals in the vehicle front-rear direction.

The floor crossmember 50 includes a U-shaped main body opened upward, and a pair of cross flanges 52 provided such that the cross flanges 52 are extended from upper ends of the main body in the vehicle front-rear direction. Respective threaded holes 52A are formed in the cross flanges 52 in their thickness direction. As will be described later, a bottom wall 34 of a panel segment 32 is fastened to the cross flanges 52, so that a closed-section structure is formed.

As illustrated in FIG. 4, as a structure of an outer end of the vehicle bottom portion in the vehicle width direction, the slope cover 45 is provided below the doors 12 and above the rocker. In FIG. 4, the slope cover 45 at a closed position is indicated by a continuous line, and the slope cover 45 at an opened position is indicated by a broken line. The slope cover 45 is turnable outwardly in the vehicle width direction around a lower end of the slope cover 45.

An outer end portion of a floor panel structure 30 in the vehicle width direction is provided below the doors 12. The floor panel structure 30 serves as a floor material in the standing-ride region 22 (see FIG. 3) and includes a plurality of panel segments 32A to 32H. The structure of the panel segments 32A to 32H will be described later.

A dust proofing panel 76 is extended in the vehicle width direction so as to be connected to the rocker outers 70. Further, a battery 80 is provided below the dust proofing panel 76. The battery 80 sends electric power to the rotary electric machine (not shown) as a drive source for the vehicle 10.

The slope device, that is, the slope plate 40 and the guide rail 42 (see FIG. 5) are provided to be sandwiched between the dust proofing panel 76 and the floor panel structure 30 in the up-down direction. That is, the slope device is provided below the standing-ride region 22. Further, the slope plate 40 and the guide rails 42 are provided between paired floor crossmembers 50 (see FIG. 7) among the floor crossmembers 50 when they are viewed in the vehicle front-rear direction.

Figure 7:
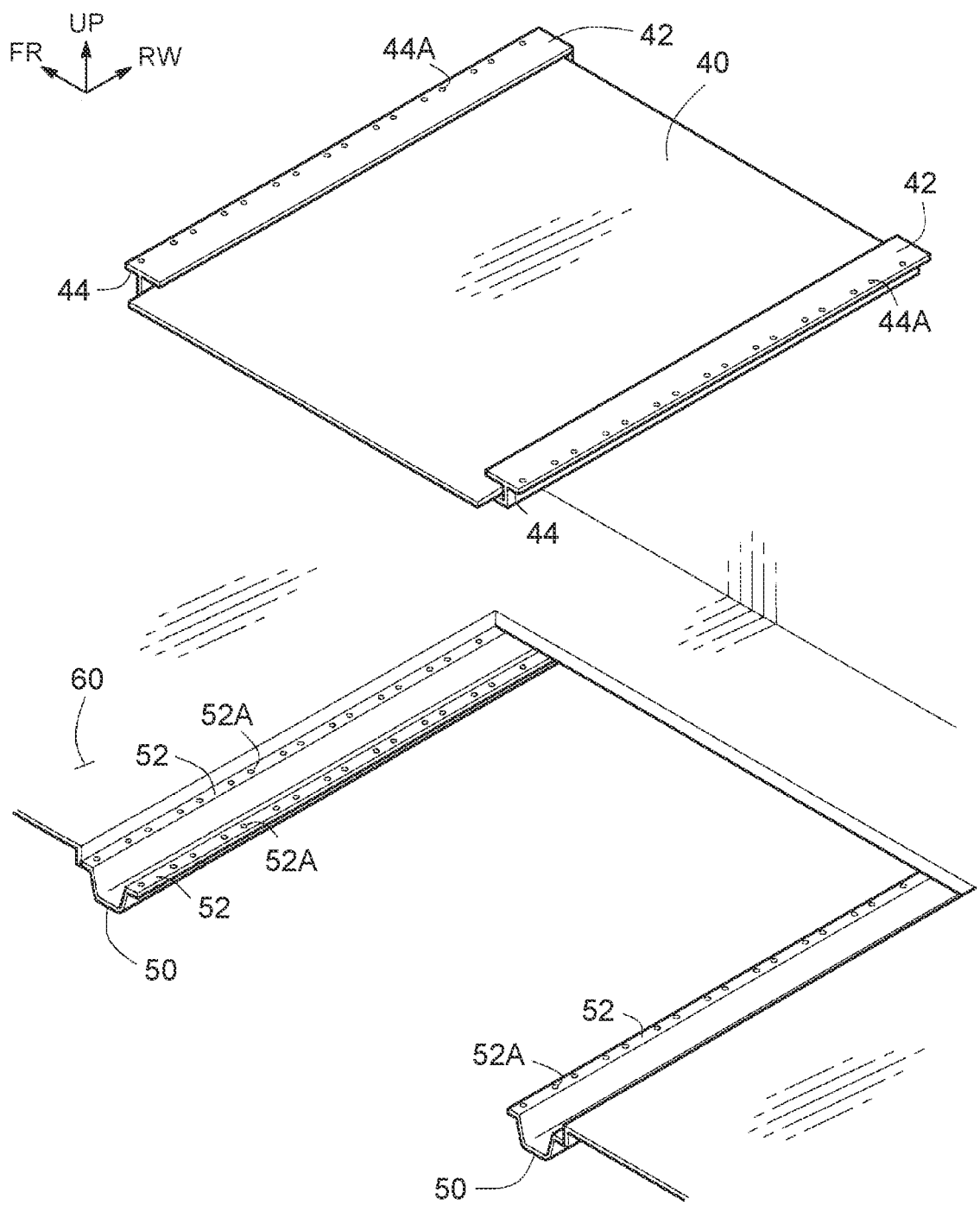
FIG. 7 is a view (1/3) to describe an assembly process of the vehicle bottom structure according to the present embodiment.

With reference to FIG. 7, the length (slope width) of the slope plate 40 in the vehicle front-rear direction is designed to be less than the offset distance between the paired floor crossmembers 50. Further, the length (slope length) of the slope plate 40 in the vehicle width direction is less than the whole length of the standing-ride region 22 in the vehicle width direction.

As illustrated in FIG. 5, the slope plate 40 is guided by the guide rails 42. As illustrated in FIG. 7, the guide rails 42 are support members extended in the vehicle width direction and provided in a pair at an interval in the vehicle front-rear direction. For example, the length (rail length) of the guide rails 42 in the vehicle width direction is designed to exceed the length (slope length) of the slope plate 40 in the vehicle width direction.

The guide rail 42 includes a guide groove 43 having a lateral U-shape and a rail flange 44 extended from the guide groove 43. Respective guide grooves 43 of the guide rails 42 are provided such that respective open ends of the guide grooves 43 face each other. More specifically, the guide groove 43 provided on the front side in the vehicle front-rear direction is opened rearward in the vehicle front-rear direction, and the guide groove 43 provided on the rear side in the vehicle front-rear direction is opened forward in the vehicle front-rear direction. Front and rear ends of the slope plate 40 in the vehicle front-rear direction are inserted into the guide grooves 43.

The guide rails 42 are arranged side by side, in the vehicle front-rear direction, with the floor crossmembers 50 as frame members of the vehicle 10, and the guide rails 42 are fastened and fixed to the floor crossmembers 50 via the rail flanges 44. The rail flange 44 is extended in a direction reverse to the extending direction of the guide groove 43, and threaded holes 44A are formed in the rail flange 44 in its thickness direction. The axes of the threaded holes 44A are aligned with the axes of the threaded holes 52A of the cross flange 52 of the floor crossmember 50, and bolts 56 are inserted into the threaded holes 44A, 52A.

Note that the slope device may include a drive mechanism configured to automatically or remotely drive the slope device, in addition to the slope plate 40 and the guide rails 42. For example, the slope device may include a motor configured to open and close the slope cover 45 or a motor configured to draw out the slope plate 40 and to move the slope plate 40 to be stored.

With reference to FIG. 4, the floor panel structure 30 serving as the floor material of the standing-ride region 22 (see FIG. 3) is provided above the slope device (the slope plate 40 and the guide rails 42). The floor panel structure 30 includes the panel segments 32A to 32H. As will be described later, the panel segments 32A to 32H are arranged side by side in the vehicle width direction and serve as the floor material of the standing-ride region 22.

Figure 6:
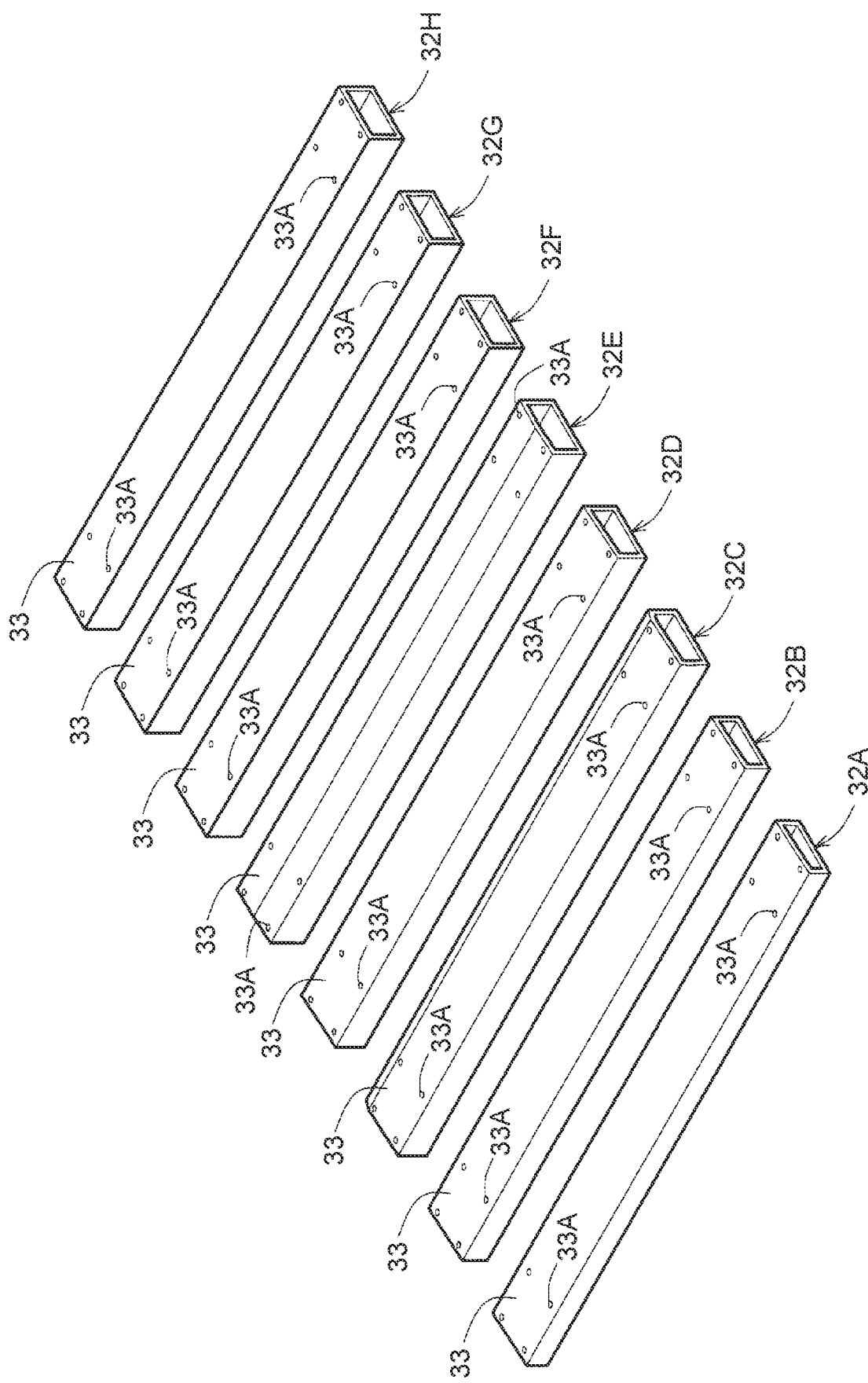
FIG. 6 is a perspective view illustrating a floor panel structure.

FIG. 6 is a perspective view illustrating the panel segments 32A to 32H.

The panel segments 32A to 32H each have a rectangular tubular shape in which a section perpendicular to its longitudinal axis (the axis in the vehicle front-rear direction) has a rectangular shape. The panel segments 32A to 32H are formed by extrusion molding of an aluminum base material, for example.

Note that, in FIG. 6, the panel segments 32 are constituted by eight members. However, the vehicle bottom structure according to the present embodiment is not limited this form. For example, a given number of panel segments 32 is formed in accordance with the machining accuracy of extrusion molding.

As illustrated in FIG. 6, the panel segments 32A to 32H have the same longitudinal length (the length in the vehicle front-rear direction). As will be described later, the panel segments 32A to 32H are extended to be provided over the paired floor crossmembers 50 separated from each other in the vehicle front-rear direction. Accordingly, the panel segments 32A to 32H are formed such that their longitudinal lengths are equal to the offset distance between the paired floor crossmembers 50.

Further, the panel segments 32A to 32H are formed such that their short-direction widths (lengths in the vehicle width direction) are shorter than the whole length of the standing-ride region 22 in the vehicle width direction. For example, when the number of the panel segments 32 is n and the whole length of the standing-ride region 22 in the vehicle width direction is A [mm], the short-direction width of each of the panel segments 32 is A/n [mm] or less.

Further, as illustrated in FIGS. 4, 6, the panel segments 32A to 32H are formed to have the same length in the longitudinal direction, while they partially have different shapes. More specifically, upper walls 33 of the panel segments 32A to 32E are inclined walls. On the other hand, the panel segments 32F to 32H have a rectangular sectional shape, and their upper walls 33 are parallel to their bottom walls 34. As will be described later, an inclined wall constituted by the panel segments 32A to 32E serves as an extension part from the slope plate 40.

That is, as illustrated in FIG. 4, the upper walls 33 of the panel segments 32A to 32E provided on the outer side in the vehicle width direction among the panel segments 32A to 32H are inclined downward toward the outer side in the vehicle width direction. Further, respective dimensions of the panel segments 32A to 32E are determined such that, when the panel segments 32A to 32E are arranged side by side in the vehicle width direction, more specifically, when bottom walls 34 of the panel segments 32A to 32E are arranged on the same plane, the upper walls 33 of the panel segments 32A to 32E constitute a continuous inclined surface.

Note that the panel segments 32A to 32C provided on the outer side in the vehicle width direction among the panel segments 32A to 32E are not covered with a mat 62 as a protective material, while the panel segments 32D, 32E provided relatively close to the inner side in the vehicle width direction are covered with the mat 62. In consideration of an influence to be given to the inclination shape by the presence or absence of covering with the mat 62, an inner end, in the vehicle width direction, of the upper wall 33 of the panel segment 32C is inclined downward toward the inner side in the vehicle width direction. The upper walls 33 of the panel segments 32D, 32E placed further closer to the inner side in the vehicle width direction are inclined upward toward the inner side in the vehicle width direction.

When the inclination formed by the upper walls 33 of the panel segments 32A to 32E is recessed once at a part where the presence or absence of the covering with the mat 62 is changed, a smooth inclined surface without projection and recess is formed in collaboration with the panel segments 32A to 32E and the mat 62.

Note that, in a case where the whole surfaces of the panel segments 32A to 32H are covered with the mat 62, a linear inclination is formed by the upper walls 33 of the panel segments 32A to 32E.

In either case, the inclination angle, to the horizontal plane, of the inclined surface formed by the upper walls 33 of the panel segments 32A to 32E may be generally equal to the inclination angle, to the horizontal plane, of the slope plate 40 when the slope plate 40 is drawn outwardly in the vehicle width direction. With such a configuration, the path length of a ramp is extended to the inside of the vehicle cabin 14. As a result, in comparison with a case where the ramp is only formed by the slope plate 40, that is, in comparison with a case where the floor face 20 of the vehicle cabin 14 is a horizontal plane from the doorway 16 (see FIG. 2), the path length of the ramp can be made longer. Hereby, such a design that an inclination gradient, that is, an uphill gradient at the time of boarding is gentle can be achieved.

In the meantime, the panel segments 32A to 32E constituting the inclined surface are each formed such that the height of the upper wall 33 from the bottom wall 34 is low, that is, the panel segments 32A to 32E are formed to be thin in comparison with the panel segments 32F to 32H constituting a flat surface. This is more obvious toward the outer side in the vehicle width direction. The height of the panel segment 32A from the bottom wall 34 to the upper wall 33 is nearly ½ of the height of the panel segment 32H from the bottom wall 34 to the upper wall 33.

Since the panel segments 32A to 32H function as the floor material in the standing-ride region 22, a load input direction in the panel segments 32A to 32H is along the height direction. The second moment of area as a parameter indicative of the difficulty in bending of a beam material to a bending moment is proportional to the cube of the dimension in the load input direction. Accordingly, when the height of the panel segment 32A is relatively small, the second moment of area might decrease.

In view of this, the panel segments 32A to 32E are formed to have wall thicknesses larger than those of the panel segments 32F to 32H. Thus, a decrease in rigidity along with the decrease in height in the panel segments 32A to 32E is compensated by the increase in wall thickness.

Further, as illustrated in FIGS. 5, 6, the opposite ends, in the longitudinal direction, of the upper walls 33 and the bottom walls 34 of the panel segments 32A to 32H have threaded holes 33A, 34A formed in the thickness direction. The threaded holes 33A formed in the upper wall 33 are so-called operation holes and are formed in order that the bolts 56 are inserted into the threaded holes 34A of the bottom wall 34.

Assembly Process of Vehicle Bottom Structure

Figure 8:
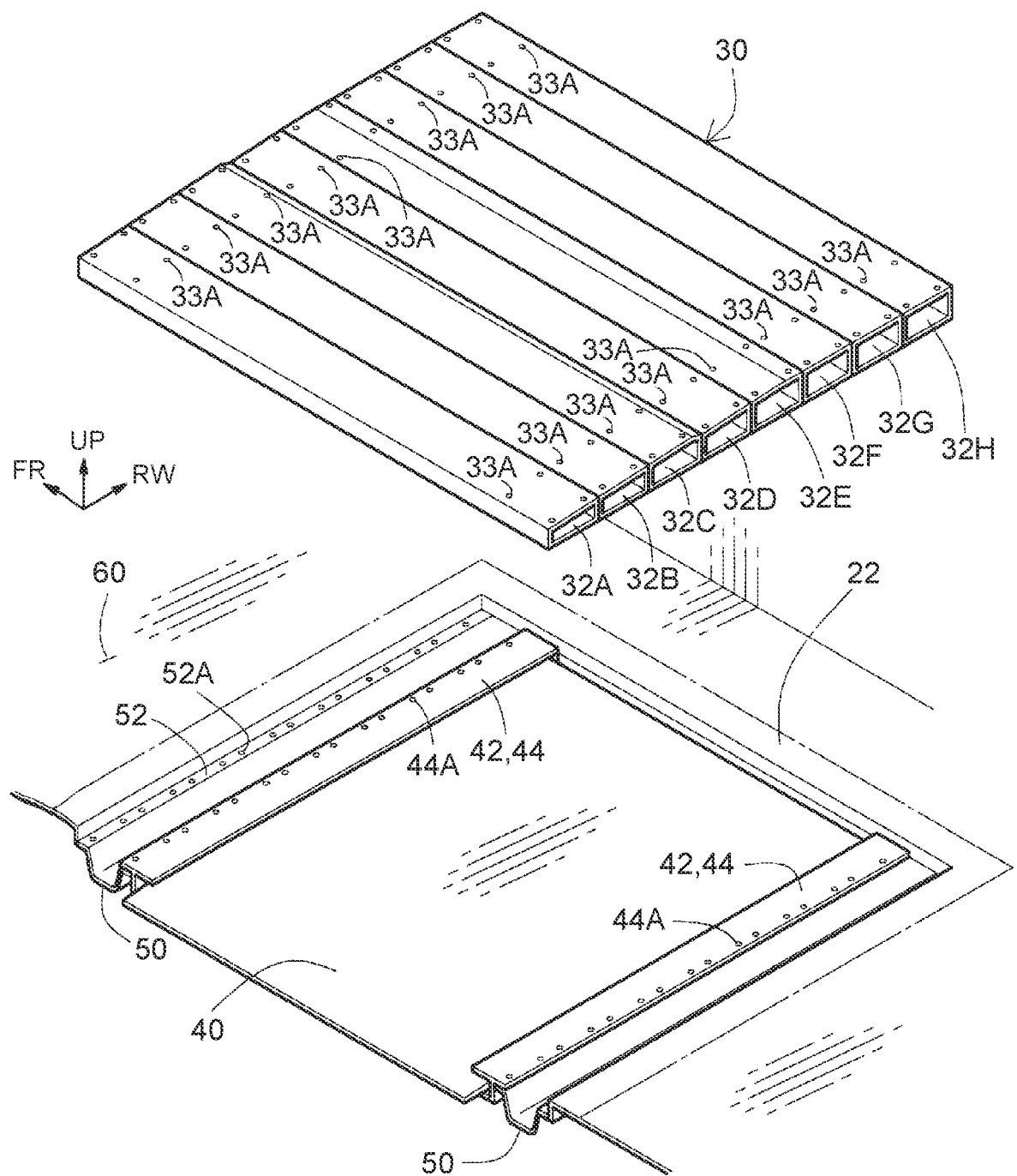
FIG. 8 is a view (2/3) to describe the assembly process of the vehicle bottom structure according to the present embodiment.
Figure 9:
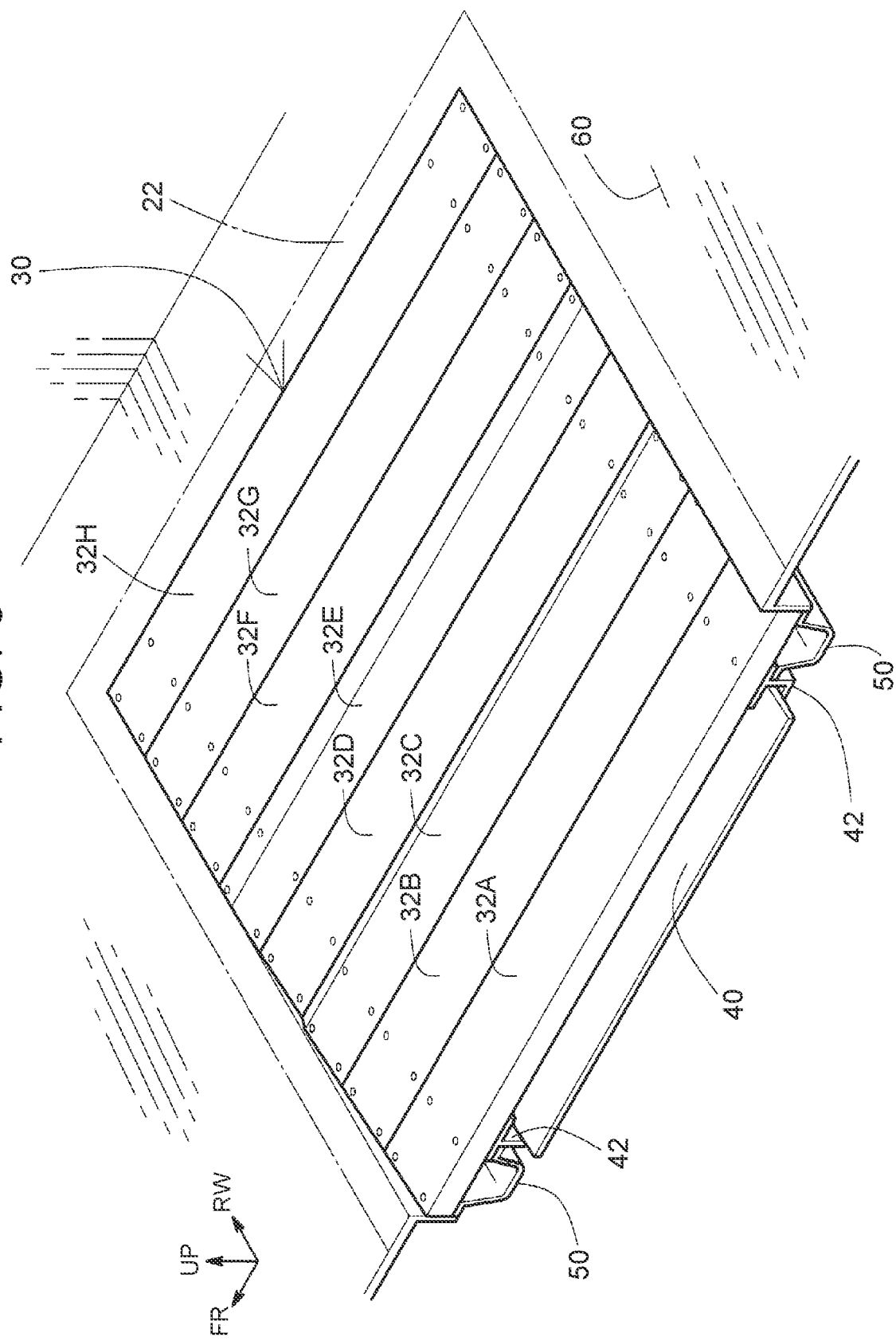
FIG. 9 is a view (3/3) to describe the assembly process of the vehicle bottom structure according to the present embodiment.

FIGS. 7 to 9 illustrate an assembly process of the vehicle bottom structure according to the present embodiment. Note that, for clear illustration, peripheral members such as the doors 12 and the mat 62 are omitted in FIGS. 7 to 9.

As illustrated in FIG. 7, a region corresponding to the standing-ride region 22 (see FIG. 3) is cut out from a floor panel 60. The paired floor crossmembers 50 are exposed in front and rear ends of the region. Further, the slope device including the slope plate 40 and the guide rails 42, and the floor panel structure 30 including the panel segments 32A to 32H are attached to the standing-ride region 22.

As illustrated in FIG. 7, the slope device is fixed to the paired floor crossmembers 50 separated from each other in the vehicle front-rear direction. That is, the axes of the threaded holes 44A of the rail flanges 44 of the guide rails 42 are aligned with the axes of the threaded holes 52A of the cross flanges 52, on the central side in the vehicle front-rear direction, of the floor crossmembers 50.

Further, as illustrated in FIG. 8, the panel segments 32A to 32H are extended in the vehicle front-rear direction so as to be provided (bridged) over the paired floor crossmembers 50. At this time, the axes of the threaded holes 33A in the opposite ends, in the longitudinal direction, of the panel segments 32A to 32H are aligned with the axes of the threaded holes 52A of the cross flanges 52 of the paired floor crossmembers 50. Further, in terms of the cross flanges 52 on the central side in the vehicle front-rear direction, the axes of the threaded holes 33A of the panel segments 32A to 32H are also aligned with the axes of the threaded holes 44A of the rail flanges 44 of the guide rails 42.

As illustrated in FIG. 5, the bolts 56 are inserted into the threaded holes the axes of which are aligned with each other. The bolts 56 are screwed into weld nuts 54 fixed to lower faces of the cross flanges 52. Due to the screwing, the guide rails 42 and the panel segments 32 are fastened and fixed to the floor crossmembers 50.

Note that, as illustrated in FIG. 8, each of the guide rails 42 is placed on the front side or the rear side of its corresponding one of the floor crossmembers 50 so as to be fastened to the corresponding one of the floor crossmembers 50. Further, the panel segments 32A to 32H are placed on the guide rails 42 and the floor crossmembers 50. That is, the lower sides of the panel segments 32A to 32H are also supported by the guide rails 42 in addition to the floor crossmembers 50. This restrains deformation of the panel segments 32A to 32H.

As illustrated in FIG. 9, most of the region where the floor panel 60 is cut out, that is, most of the standing-ride region 22 is supported by the panel segments 32A to 32H as the floor panel structure 30. Further, the mat 62 is put on the floor crossmembers 50 and the panel segments 32A to 32H, and thus, the floor face 20 of the vehicle cabin is formed.

Figure 10:
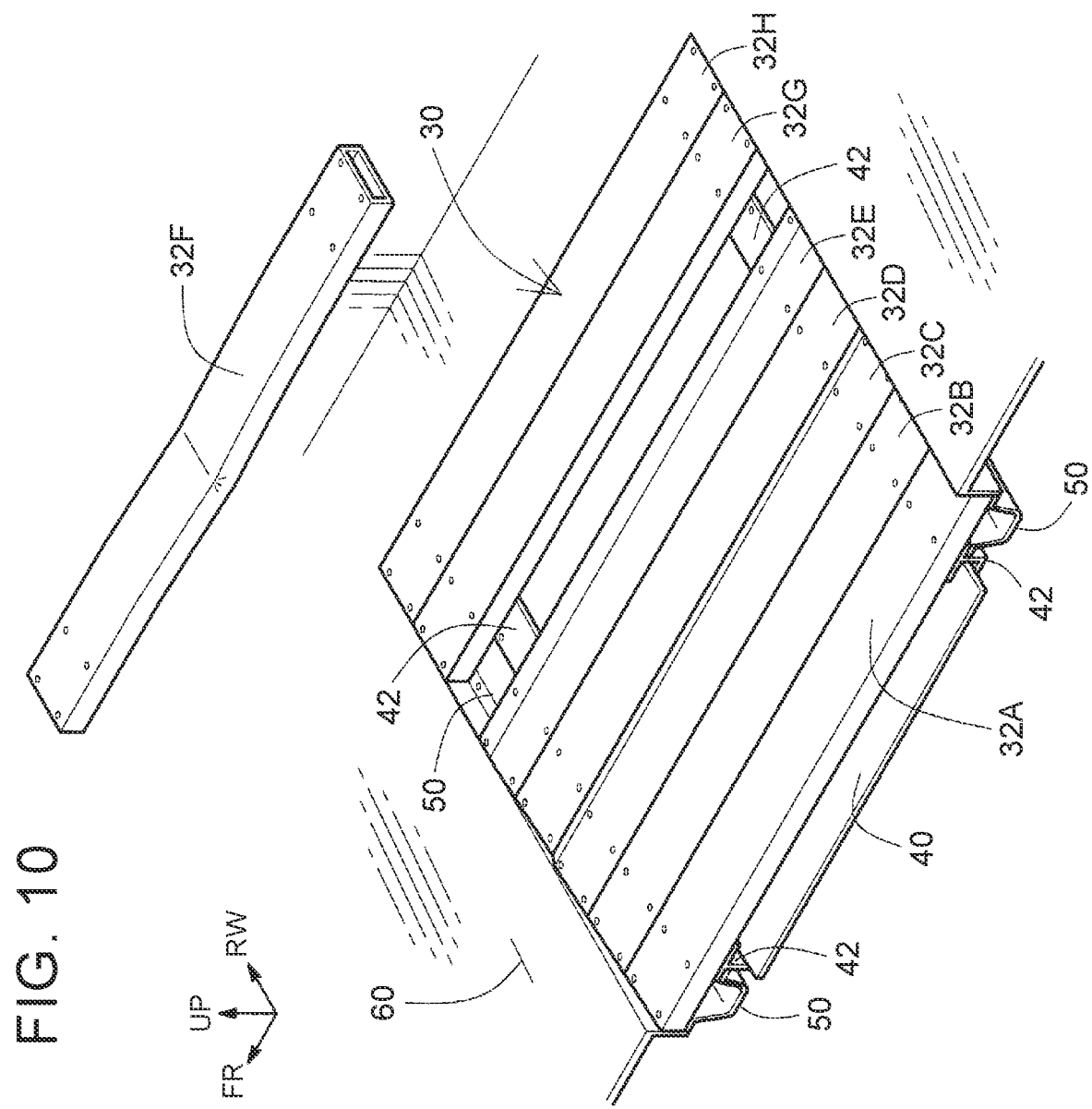
FIG. 10 is a perspective view illustrating a state at the time when a panel segment is replaced.

FIG. 10 illustrates a state at the time of maintenance of the floor face 20. In a case where the panel segment 32F is deformed to bend (sink) as a result of input of a load from passengers in the standing-ride region 22, only the panel segment 32F thus deformed is removed among the panel segments 32A to 32H, and a new panel segment 32F is attached. Since only a deformed part is replaced as such, a work load is reduced in comparison with a case where the whole floor panel 60 is replaced, for example.

Further, at the time of maintenance of the slope plate 40 or the guide rails 42 below the panel segments 32A to 32H, part of the panel segments 32A to 32H that corresponds to an inspection target part is just removed. Thus, maintenance performance improves.

Further, particularly in a case where the panel segments 32A to 32H are integrated by welding or the like, full maintenance can be performed on the slope plate 40 or the guide rails 42 by removing a single-plate-shaped assembly of the panel segments 32A to 32H. With such an embodiment, the slope plate 40 or the guide rails 42 can be exposed by just removing the plate material (the assembly of the panel segments 32A to 32H) once, in comparison with a case where the panel segments 32A to 32H are divided bodies independent from each other.

Further, in the vehicle bottom structure according to the present embodiment, instead of covering the whole floor of the vehicle cabin with a single floor panel, the standing-ride region 22 is covered with the floor panel structure 30, that is, the panel segments 32A to 32H. Hereby, when sinking deformation occurs in the standing-ride region 22, only the floor panel structure 30 is just replaced from the floor of the vehicle cabin, and thus, the maintenance performance of the floor panel improves.

What is claimed is:

1. A vehicle bottom structure having a standing-ride region provided as a region inside a vehicle cabin with a doorway being provided at a side face of the standing-ride region, the vehicle bottom structure comprising:
   a plurality of floor crossmembers as frame members provided in a vehicle bottom portion in an extended manner in a vehicle width direction, the floor crossmembers being arranged at intervals in a vehicle front-rear direction;
   a slope device provided between paired floor crossmembers among the floor crossmembers, the slope device being provided below the standing-ride region; and
   a floor panel structure serving as a floor material in the standing-ride region, the floor panel structure being provided over the paired floor crossmembers such that the floor panel structure is placed above the slope device, wherein:
   the floor panel structure includes a plurality of panel segments extended in the vehicle front-rear direction so as to be provided over the paired floor crossmembers, a whole length of the plurality of the panel segments in the vehicle width direction being shorter than a whole length of the standing-ride region in the vehicle width direction; and
   the panel segments are arranged side by side in the vehicle width direction in the standing-ride region.

2. The vehicle bottom structure according to claim 1, wherein:
   the slope device includes
      a slope plate drawable outwardly in the vehicle width direction, and
      a pair of guide rails configured to guide the slope plate, the guide rails being extended in the vehicle width direction and provided at an interval in the vehicle front-rear direction;
   the guide rails are arranged side by side with the paired floor crossmembers and fixed to the paired floor crossmembers; and
   the panel segments are supported by the guide rails in addition to the paired floor crossmembers.

3. The vehicle bottom structure according to claim 1, wherein:
   the panel segments each have a rectangular tubular shape in which a section perpendicular to an axis in the vehicle front-rear direction has a rectangular shape;
   an upper wall of a panel segment placed on an outer side in the vehicle width direction among the panel segments is inclined downward toward the outer side in the vehicle width direction;
   the panel segment placed on the outer side in the vehicle width direction is formed such that a height of the upper wall is lower than a height of an upper wall of a panel segment placed on an inner side in the vehicle width direction among the panel segments; and
   a wall thickness of the panel segment placed on the outer side in the vehicle width direction is thicker than a wall thickness of the panel segment placed on the inner side in the vehicle width direction.

4. A vehicle bottom structure having an aisle region provided as a region in a vehicle cabin and serving as an aisle from a doorway to a passenger seat, the vehicle bottom structure comprising:
   a plurality of floor crossmembers as frame members provided in a vehicle bottom portion in an extended manner in a vehicle width direction, the floor crossmembers being arranged at intervals in a vehicle front-rear direction;
   a slope device provided between paired floor crossmembers among the floor crossmembers, the slope device being provided below the aisle region; and
   a floor panel structure serving as a floor material in the aisle region, the floor panel structure being provided over the paired floor crossmembers such that the floor panel structure is placed above the slope device, wherein:

the floor panel structure includes a plurality of panel segments extended in the vehicle front-rear direction so as to be provided over the paired floor crossmembers, a whole length of the plurality of the panel segments in the vehicle width direction being shorter than a whole length of the aisle region in the vehicle width direction; and the panel segments are arranged side by side in the vehicle width direction in the aisle region.

* * * * *